United States Patent [19]

Leland et al.

[11] Patent Number: 4,680,326

[45] Date of Patent: Jul. 14, 1987

[54] POLY(ARYLENE SULFIDE) COMPOSITION WITH IMPROVED INSULATION RESISTANCE AND CRACKING RESISTANCE

[75] Inventors: John E. Leland; James S. Dix; Roy F. Wright, all of Bartlesville, Okla.

[73] Assignee: Phillips Petroleum Company, Bartlesville, Okla.

[21] Appl. No.: 892,722

[22] Filed: Jul. 29, 1986

Related U.S. Application Data

[63] Continuation of Ser. No. 723,985, Apr. 16, 1985, abandoned.

[51] Int. Cl.$^4$ ............ C08K 5/54; C08K 5/34; C08K 5/16
[52] U.S. Cl. .................... 524/106; 524/98; 524/99; 524/262; 524/424; 524/502; 524/609; 525/189
[58] Field of Search ............ 524/502, 262, 424, 609, 524/104, 106; 525/189

[56] References Cited

U.S. PATENT DOCUMENTS

| | | | |
|---|---|---|---|
| 4,025,582 | 5/1977 | Needham | 524/502 |
| 4,134,874 | 1/1979 | Needham | 260/37 |
| 4,176,098 | 11/1979 | Needham | 260/18 |
| 4,284,549 | 8/1981 | Salce | 524/262 |
| 4,337,182 | 6/1982 | Needham | 524/609 |
| 4,350,786 | 9/1982 | Blackwell et al. | 524/263 |
| 4,443,571 | 4/1984 | Needham et al. | 524/90 |
| 4,448,918 | 5/1984 | Leland | 524/262 |
| 4,451,601 | 5/1984 | Blackwell | 524/263 |
| 4,474,921 | 4/1983 | Dix | 524/423 |
| 4,476,265 | 10/1984 | Blackwell | 524/10 |
| 4,482,665 | 11/1984 | Dix | 524/262 |
| 4,482,668 | 11/1984 | Leland et al. | 524/413 |
| 4,528,310 | 7/1985 | Blackwell | 524/609 |
| 4,529,769 | 7/1985 | Johnson et al. | 524/425 |
| 4,544,700 | 10/1985 | Wright | 524/609 |

FOREIGN PATENT DOCUMENTS 56-136847  10/1981  Japan ................ 524/502

OTHER PUBLICATIONS

Shue, R. S. Walker, J. H., Dix, J. C. and Brady D. G., "HMW Injection-Molding Polyphenylene Sulfide . . . ", Plastic Engineering, Apr. 1983, pp. 37–39.

Primary Examiner—Lewis F. Jacobs

[57] ABSTRACT

Poly(arylene sulfide) compositions are disclosed having a combination of good cracking resistance and electrical insulation resistance. Such compositions have a variety of uses including uses in molded electrical components.

33 Claims, No Drawings

POLY(ARYLENE SULFIDE) COMPOSITION WITH IMPROVED INSULATION RESISTANCE AND CRACKING RESISTANCE

This application is a continuation of application Ser. No. 723,985, filed Apr. 16, 1985, now abandoned.

This invention relates to poly(arylene sulfide) compositions. In another aspect the invention relates to poly(arylene sulfide) compositions with improved electrical insulation resistance and cracking resistance. The invention also relates to a process for producing poly(arylene sulfide) compositions.

BACKGROUND

Poly(arylene sulfide) is a unique material that has been produced commercially for a number of years and has found application in a variety of areas. Poly(arylene sulfide) is resistant to most chemicals, it has a relatively high melting temperature compared to other thermoplastics and it has good dimensional stability and other properties which permit its wide variety of uses.

Poly(arylene sulfide) materials have found application in the electronics industry, but generally it is considered that the use of such materials in that industry is small in comparison to the potential that such materials have in that area. Electrical applications in which cracking resistance coupled with very high electrical insulation resistance are numerous and poly(arylene sulfide) compositions are highly desirable for such uses when one considers the inherent properties of poly(arylene sulfide) materials; however, thus far poly(arylene sulfide) compositions have not been formulated which have both good cracking resistance and electrical insulation resistance.

OBJECTS

Therefore an object of the invention is a poly(arylene sulfide) composition having good cracking resistance and electrical insulation resistance.

Another object of the invention is a poly(arylene sulfide) composition which can be molded into articles having improved cracking resistance and electrical insulation resistance as compared to such compositions of the prior art.

SUMMARY OF THE INVENTION

According to the invention, the inventive composition comprises poly(arylene sulfide), a reinforcing material, low density polyethylene and at least one organosilane. Such a composition will generally contain from about 30 to 80 weight % of the poly(arylene sulfide) component, from about 20 to about 70 weight % of the reinforcing material, from about 0.5 to about 10 weight % of the low density polyethylene and from about 0.1 to about 5 weight % of at least one organosilane.

Prior to the present, poly(arylene sulfide) compositions were not available which provided good cracking resistance and at the same time an electrical insulation resistance of at least $1.0 \times 10^9$ ohms. The present inventive compositions combine these two properties with the outstanding properties of poly(arylene sulfides) and provide a composition which is useful to mold a variety of articles including thick walled articles used in the electrical industry. Further, the compositions of the present invention can be improved in appearance by the addition of certain pigments such as certain carbon black materials and the mold life can be improved by the incorporation of the mold corrosion inhibitors such as hydrotalcite.

DETAILED DESCRIPTION OF THE INVENTION

In its broadest aspect the present invention contains poly(arylene sulfide), reinforcing material, low density polyethylene and at least one organosilane. For convenience Table I is provided showing the broad, medium and narrow ranges of the above components with the value shown representing weight percent based on total weight of the composition, although inventive compositions outside Table I are possible.

TABLE I

| Component | Broad | Medium | Narrow |
|---|---|---|---|
| Poly (arylene sulfide) | 30–80 | 40–75 | 50–70 |
| Reinforcing material | 20–70 | 25–60 | 30–50 |
| Low density polyethylene | 0.5–10 | 0.5–5 | .75–3 |
| Organosilane | 0.1–5 | 0.1–4 | .25–3 |

Suitable poly(arylene sulfide) resins useful in the present invention for example are those described in U.S. Pat. Nos. 3,919,177 and 4,038,261 and these U.S. Patents are incorporated herein by reference. The preferred poly(arylene sulfide) is poly(phenylene sulfide). Generally, the poly(arylene sulfide) will have a melt flow of less than about 400 grams per 10 minutes, as measured by ASTM D-1238 using a 5 kilogram weight at 600° F. through a 0.0825 inch diameter orifice. Suitable poly(arylene sulfide) resins useful in the present invention can be prepared according to the processes described in the patents referenced above, and particularly as described in U.S. Pat. No. 4,038,261 employing a minor amount of trichlorobenzene branching agent to achieve the desired melt flow. The most preferred poly(arylene sulfide) resins useful in the present invention are those manufactured by Phillips Petroleum Company and marketed as Ryton poly(phenylene sulfide) resins having a melt flow of from about 10 to about 400 grams per 10 minutes determined by the ASTM test referenced above. It is also within the scope of the invention to employ copolymers of poly(arylene sulfide). Generally, although not necessarily, such copolymers will contain at least 90 mole percent of unsubstituted phenylene units.

The preferred reinforcing material used in the present invention is glass fibers. While there are a variety of glass fiber reinforcing materials available, those specifically developed for electrical applications are preferred, which are often referred to as "E glass". If a finish or sizing is used on the glass fibers it should be one that is compatible with the other components of the composition, such as the organosilane. Glass fibers that have been used in the inventive composition with good results are those produced by Owens-Corning Corporation and marked as Fiberglas 497.

The compositions of the present invention also contain a minor amount of a low density polyethylene. Ethylene homopolymers and copolymers may be used, with ethylene polymers prepared by the incorporation of monomers comprising at least about 90 mole percent ethylene with 10 to 0 per mole percent of the remaining comonomer being preferably a 1-olefin. As used herein, low density polyethylenes are those generally having a density of from about 0.910 to about 0.940, preferably from about 0.910 to about 0.930, as determined by ASTM test method D-1505. Further although not essential it is desirable for the low density polyethylene component to have a melt index greater than about 100 grams per 10 minutes and more preferably greater than about 400 grams per 10 minutes as determined by ASTM test method D-1238 Condition E.

The last essential component of the present inventive composition is at least one organosilane. The organosilanes useful in the present invention are represented by the following generic formula:

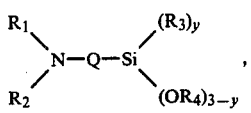

where
R₁ and R₂ are individually selected from the group consisting of hydrogen, alkyl, alkaryl, aminoalkyl, carboxyalkylaminoalkyl, aryl, aralkyl, carbamoyl, hydroxyalkyl, and vinylaralkylaminoalkyl groups containing 1 to 10 carbon atoms, also may be where R₁ and R₂ are joined by a valence bond to form a cyclic structure of from 5 to 16 atoms including the nitrogen atom therein, R₃ and R₄ are individually selected from the group consisting of alkyl and cycloalkyl groups containing 1 to 6 carbon atoms, Q is a divalent hydrocarbon radical containing from 1 to 18 carbon atoms, and y is 0, 1 or 2.

Representative organosilanes are:
3-Aminopropyltrimethoxysilane,
3-Aminopropyltriethoxysilane,
3-Aminopropylmethyldiethoxysilane,
N-Phenyl-3-aminopropyltrimethoxysilane,
p-Aminophenyltrimethoxysilane,
3-(Diethylamino)propyltrimethoxysilane,
N-beta-(Aminoethyl)-gamma-aminopropyltrimethoxysilane,
N-(2-aminoethyl)-N'-[3-trimethoxysilyl)propyl]-1,2-ethanediamine,
N-(3-aminopropyl)-N'-[(trimethoxysilyl)methyl]-1,3-propanediamine,
Methyl 3-[2-(trimethoxysilylpropylamino)-ethylamino]-propionate,
N-{2-[3-(trimethoxysilyl)propylamino]ethyl}-p-vinylbenzylammonium chloride,
N-bis-(2-hydroxyethyl)-3-aminopropyltriethoxysilane,
gamma-Ureidopropyltriethyloxysilane, and
gamma-[1-(4,5-dihydroimidazoline]-propyltriethoxysilane.

In addition to the four essential components described above the inventive composition can also contain optional components such as mold corrosion inhibitors, pigments, processing aids and the like. Since one of the primary uses for the inventive composition will be as a molding compound and since poly(arylene sulfide) compositions are somewhat corrosive in nature, in order to increase mold life a mold corrosion inhibitor such as, for example, a hydrotalcite may be used without adverse effect to the cracking resistance and the electrical insulation resistance of the inventive composition. As shown in the Examples, the hydrotalcite DHT-4A sold by Kyowa Chemical Industry Company, Limited, Osaha, Japan was used with excellent results. Further it is frequently desirable to incorporate a pigment in the inventive composition so that the articles produced from the inventive composition have a uniform color. Often the parts produced from poly(arylene sulfide) compositions have a somewhat streaky or nonuniform appearance and the incorporation of a pigment, particularly those developed for electrical applications, may be used. For example, a pigment such as channel black has been used in the inventive composition and results in products having a uniform color without affecting the cracking resistance and the electrical insulation resistance. The pigment used in the inventive composition with excellent results was a channel black sold by the West German company Degussa, and marked as Special Black-4, regular color channel black.

For convenience Table II is provided to show the preferred broad, medium and narrow ranges for the amount of mold corrosion inhibitor and pigments. The amounts shown are in terms of weight percent based on total weight of the composition and are included as optional additional components to Table I above.

TABLE II

| Component | Broad | Medium | Narrow |
|---|---|---|---|
| Mold corrosion inhibitor | 0.1–10 | 0.2–7 | 0.5–5 |
| Pigment | 0.1–5 | 0.1–3 | 0.2–2 |

As indicated above other components may be incorporated into the inventive composition such as a processing aid and the like depending upon the particular needs and requirements of the user.

In accordance with the process of the present invention, it has been found essential to carry out the hot melt extrusion of the dry blended mix of the components of the present inventive composition at as low an average machine temperature as possible and still obtain good homogeneity of the resulting product. As used herein the term "average machine temperature" means the average temperature of at least four (4) and preferably eight (8) approximately equally spaced temperature sensing means located on the extruder. As the data shows in the following examples the higher the average machine temperature the lower the cracking resistance of the resulting composition. Good results regarding cracking resistance were obtained when the average machine temperature was less than about 675° F., preferably less than about 650° F. and more preferably less than about 630° F.

As indicated earlier the inventive compositions are well adapted for use in applications where excellent electrical insulation resistance is important as well as those in which resistance to cracking is important. While the inventive compositions were developed for applications in the electrical apparatus field, they are useful in a variety of areas and their particular applicability in the electrical field should not be construed as a limitation upon the inventive compositions.

The following examples show the results obtained as a result of testing a number of compositions for cracking resistance and insulation resistance, some of which are outside the scope of the present inventive composition.

EXAMPLES

Twenty-four different compositions as shown in Table III were produced in 50 pound batches. Examples 1 through 11 and 18 and 19 illustrate compositions outside the scope of the present invention and examples 12 through 17 and 20 through 24 illustrate compositions in accordance with the present invention. The letters "NC" and "IC" shown in Table III mean non-inventive compositions and inventive compositions, respectively. Each composition was prepared by blending its components, except for glass, for about 3 minutes in a Henschel mixer at room temperature operating at about 1800 rpm. After this mixing period the glass reinforcement was added and mixing continued for about 3 additional seconds. Each mixture produced thereby was passed through a Crown Products 2½ inch diameter single screw extruder with a length to diameter ratio of 40:1. The average machine temperature which the melt was exposed to is indicated in Table III. The extruded material was cut into pellets and injection molded according to the procedure described below in the section entitled "Internal Cracking Resistance Measurement". Also, the compositions were tested for their electrical insulation resistance according to the procedure described below.

ELECTRICAL INSULATION RESISTANCE MEASUREMENT

The electrical insulation resistance was tested in accordance with the general method defined in ASTM test method D257 using a conditioning period of 48 hours in a 95±1% relative humidity chamber at 90° C. The ASTM recommended practice E104 for controlling relative humidity was followed. The resistance was measured employing a 500 volt potential and a GenRad Megohmeter (type 1862-C) having a capability of measuring resistance upto $2 \times 10^{12}$ ohms.

INTERNAL CRACKING RESISTANCE MEASUREMENT

The procedure to determine the resistance of poly(arylene sulfide) compounds to internal cracking is as follows: The resin composition is dried at 150° C. for two hours in forced air oven in trays that are not more than 1.5 inches deep. A New Britain model 75 injection molding machine containing a water-cooled, center-gated mold is used to produce flat disks that are 2.5 inches in diameter by 0.5 inches thick. The injection pressure and holding pressure may be varied to match resin compositions to effect disk production. The other operating conditions of injection molding must be set and maintained at values indicated below.

| CONDITION | SETTING |
| --- | --- |
| Mold Cavity Temperature | 38° C. |
| Clamp Pressure | Maximum Attainable |
| Barrel Melt Temperature | 316° C. |
| Nozzle Melt Temperature | 316° C. |
| Screw Speed | Maximum |
| Back Pressure | None |
| Injection Speed | Maximum |
| Injection Time | 5 seconds |
| Hold Time | 18 seconds |

| CONDITION | SETTING |
| --- | --- |
| Hold Pressure | 10,000 psig |
| Injection Pressure | 10,000 psig |
| Cool Time | 150 seconds |

The shot size is sufficient to fill the mold with a 0.25 inch cushion and with no flash. The injection molder barrel is flushed three times with the resin composition to be tested. The next two or more shots are discarded before the next eighteen are collected and numbered in sequence. Immediately upon removal from the mold and while the disk is warm, the sprue is removed. Each disk is allowed to cool for at least two hours. Disks 5, 6, 7, 8, 10, 11, 12 and 13 are sawed parallel to the face to yield two disks each being approximately 0.25 inches thick. A Dayton metal cutting bandsaw (Model 3Z360G) equipped with a blade of ten teeth per inch is used to saw the disks. The sawn disks and the whole disks 1, 2, 3, 4, 14, 15, 16, 17 and 18 are annealed by being placed in a forced air oven at 204° C. for two hours. The whole and half disks are then cooled for eighteen to twenty-four hours. Disks 1, 2, 3, 4, 14, 15, 16 and 17 are sawed parallel to the face to yield two disks approximately 0.25 inch thick. The disks are then allowed to set at room temperature for an additional eighteen to twenty-four hours before rating. Whole disks numbered 9 (unannealed) and 18 (annealed) are saved for reference. The non-sprue sides of each half-disk are rinsed under a stream of warm water to remove sawdust and visually examined for cracks. Each disk is classified as non-cracked or cracked. The number of cracked disks observed out of the total observed from each of the two groups, cut/annealed non-sprue and annealed/cut non-sprue are reported as a ratio of cracked disks to the total disks tested of that specific group, for example, a 4/8 annealed and cut non-sprue rating indicates that 4 disks were cracked out of 8 disks that were annealed, then cut and then examined for cracks. While the sprue sides can also be examined, the sprue side is subject to more variables which give somewhat less unreliable results compared to the non-sprue side. A resin composition yielding no more than a total of 9 cracked disks on the non-sprue side out of a total of 16 disks with 8 annealed and cut specimens and 8 cut and annealed specimens is required to be satisfactory for molding applications of thick articles.

It is also noted that the above-described Internal Cracking Resistance test was published in *Plastics Engineering*, April 1983, page 38, under the title "Screening Test for PPS Compounds" and is incorporated by reference herein.

TABLE III

| Examples | | 1 | 2 | 3 | 4 | 5 | 6 |
| --- | --- | --- | --- | --- | --- | --- | --- |
| A. Composition, Wt. % | | NC | NC | NC | NC | NC | NC |
| 1. PPS | | | | | | | |
| | Low[a] | 57.5 | 57.5 | — | — | — | 56.5 |
| | High[b] | — | — | 57.5 | 56.5 | 56.5 | — |
| 2. Glass Fiber[c] | | 40 | 40 | 40 | 40 | 40 | 40 |
| 3. Polyethylene, LD[d] | | 1 | 1 | 1 | 1 | 1 | 1 |
| 4. Silane, 1 Wt. % of: | | 0 | 0 | 0 | Z6032[i] | 1506[g] | Y9194[e] |
| 5. Mold Corrosion Inhibitor | | | | | | | |
| | $Li_2CO_3$ | 1 | — | 1 | 1 | 1 | 1 |
| | DHT-4A[l] | — | 1 | — | — | — | — |
| 6. Pigment[m] | | 0.5 | 0.5 | 0.5 | 0.5 | 0.5 | 0.5 |
| B. Properties | | | | | | | |
| 1. Insulation Resistance, ohm | | $1.6 \times 10^7$ | $4.5 \times 10^7$ | $2.7 \times 10^7$ | $2.6 \times 10^8$ | $7.3 \times 10^8$ | $8.4 \times 10^8$ |

TABLE III-continued

| | | | | | | | |
|---|---|---|---|---|---|---|---|
| 2. | Cracking Resistance | | | | | | |
| | a. Cut and Annealed[n] Non-sprue side | 0 | — | 0 | 6 | 1 | 8 |
| | b. Annealed and Cut[n] Non-sprue side | 0 | — | 0 | 0 | 0 | 1 |
| C. | Machine Conditions | | | | | | |
| 1. | Zone Temp, °F. | | | | | | |
| | a. Zone 1 | 661 | 665 | 660 | 622 | 626 | 662 |
| | b. Zone 2 | 637 | 640 | 630 | 613 | 619 | 641 |
| | c. Zone 3 | 616 | 644 | 614 | 609 | 609 | 614 |
| | d. Zone 4 | 619 | 639 | 612 | 611 | 611 | 614 |
| | e. Zone 5 | 623 | 645 | 614 | 614 | 620 | 617 |
| | f. Zone 6 | 614 | 645 | 615 | 641 | 639 | 615 |
| | g. Zone 7 | 615 | 647 | 616 | 610 | 610 | 615 |
| | h. Zone 8 | 615 | 646 | 617 | 615 | 617 | 619 |
| 2. | Avg. Machine Temp, °F. | 619 | 646 | 622 | 617 | 619 | 625 |
| 3. | Die Face Melt Temp, °F. | 582 | 598 | 590 | 597 | 575 | 589 |
| 4. | Production Rate, lb/hr | 184 | 118 | 138 | 299 | 283 | 180 |

| Examples | | 7 | 8 | 9 | 10 | 11 | 12 |
|---|---|---|---|---|---|---|---|
| A. | Composition, Wt. % | NC | NC | NC | NC | NC | IC |
| 1. | PPS | | | | | | |
| | Low[a] | — | — | — | — | — | — |
| | High[b] | 56.5 | 56.5 | 56.5 | 56.5 | 56.5 | 56.5 |
| 2. | Glass Fiber[c] | 40 | 40 | 40 | 40 | 40 | 40 |
| 3. | Polyethylene, LD[d] | 1 | 1 | 1 | 1 | 1 | 1 |
| 4. | Silane, 1 Wt. % of: | AMEO[h] | Z6032[i] | A189[f] | A189[f] | Y9194[e] | 1506[g] |
| 5. | Mold Corrosion Inhibitor | | | | | | |
| | Li$_2$CO$_3$ | 1 | — | 1 | — | — | 1 |
| | DHT-4A[l] | — | 1 | — | 1 | 1 | — |
| 6. | Pigment[m] | 0.5 | 0.5 | 0.5 | 0.5 | 0.5 | 0.5 |
| B. | Properties | | | | | | |
| 1. | Insulation Resistance, ohm | $9.3 \times 10^8$ | $8.5 \times 10^8$ | $1.3 \times 10^9$ | $8.6 \times 10^9$ | $2.3 \times 10^9$ | $4.3 \times 10^9$ |
| 2. | Cracking Resistance | | | | | | |
| | a. Cut and Annealed[n] Non-sprue side | 0 | 0 | 8 | 8 | 8 | 4 |
| | b. Annealed and Cut[n] Non-sprue side | 0 | 0 | 6 | 8 | 5 | 1 |
| C. | Machine Conditions | | | | | | |
| 1. | Zone Temp, °F. | | | | | | |
| | a. Zone 1 | 637 | 632 | 634 | 636 | 662 | 664 |
| | b. Zone 2 | 621 | 617 | 620 | 619 | 627 | 614 |
| | c. Zone 3 | 615 | 609 | 610 | 611 | 613 | 614 |
| | d. Zone 4 | 611 | 611 | 611 | 611 | 617 | 617 |
| | e. Zone 5 | 612 | 615 | 618 | 612 | 616 | 621 |
| | f. Zone 6 | 695 | 672 | 653 | 690 | 617 | 618 |
| | g. Zone 7 | 610 | 610 | 610 | 610 | 616 | 617 |
| | h. Zone 8 | 614 | 613 | 613 | 611 | 615 | 620 |
| 2. | Avg Machine Temp, °F. | 627 | 622 | 621 | 625 | 623 | 623 |
| 3. | Die Face Melt Temp, °F. | 586 | 590 | 589 | 590 | 589 | 588 |
| 4. | Production Rate, lb/hr | 285 | 258 | 283 | 242 | 125 | 231 |

| Examples | | 13 | 14 | 15 | 16 | 17 | 18 |
|---|---|---|---|---|---|---|---|
| A. | Composition, Wt. % | IC | IC | IC | IC | IC | NC |
| 1. | PPS | | | | | | |
| | Low[a] | — | 56.5 | — | — | — | — |
| | High[b] | 56.5 | — | 56.5 | 56.5 | 56.5 | 56.5 |
| 2. | Glass Fiber[c] | 40 | 40 | 40 | 40 | 40 | 40 |
| 3. | Polyethylene, LD[d] | 1 | 1 | 1 | 1 | 1 | 1 |
| 4. | Silane, 1 Wt. % of: | 1506[g] | 1506[g] | 1506[g] | 1506[g] | 1506[g] | 1506[g] |
| 5. | Mold Corrosion Inhibitor | | | | | | |
| | Li$_2$CO$_3$ | — | — | — | — | 1 | 1 |
| | DHT-4A[l] | 1 | 1 | 1 | 1 | 0.5 | 0.5 |
| 6. | Pigment[m] | 0.5 | 0.5 | 0.5 | 0.5 | | |
| B. | Properties | | | | | | |
| 1. | Insulation Resistance, ohm | $3 \times 10^9$ | $2.7 \times 10^9$ | $1.1 \times 10^{10}$ | $2 \times 10^{10}$ | $3.7 \times 10^{10}$ | $1 \times 10^{10}$ |
| 2. | Cracking Resistance | | | | | | |
| | a. Cut and Annealed[n] Non-sprue side | 8 | 0 | 0 | 0 | 8 | 8 |
| | b. Annealed and Cut[n] Non-sprue side | 0 | 0 | 0 | 0 | 0 | 3 |
| C. | Machine Conditions | | | | | | |
| 1. | Zone Temp, °F. | | | | | | |
| | a. Zone 1 | 635 | 660 | 664 | 643 | 648 | 678 |
| | b. Zone 2 | 651 | 637 | 624 | 586 | 591 | 688 |
| | c. Zone 3 | 610 | 614 | 615 | 594 | 596 | 697 |

TABLE III-continued

| | | | | | | |
|---|---|---|---|---|---|---|
| d. Zone 4 | 611 | 621 | 617 | 598 | 601 | 700 |
| e. Zone 5 | 618 | 623 | 619 | 601 | 615 | 700 |
| f. Zone 6 | 644 | 621 | 621 | 601 | 603 | 701 |
| g. Zone 7 | 610 | 617 | 616 | 601 | 601 | 702 |
| h. Zone 8 | 613 | 619 | 615 | 601 | 605 | 701 |
| 2. Avg Machine Temp, °F. | 620 | 627 | 624 | 603 | 608 | 696 |
| 3. Die Face Melt Temp, °F. | 575 | 584 | 589 | 560 | 579 | 636 |
| 4. Production Rate, lb/hr | 236 | 153 | 128 | 61 | 105 | 125 |

| Examples | 19 | 20 | 21 | 22 | 23 | 24 |
|---|---|---|---|---|---|---|
| A. Composition, Wt. % | NC | IC | IC | IC | IC | IC |
| 1. PPS | | | | | | |
| Low[a] | — | — | — | — | — | — |
| High[b] | 56.5 | 56.5 | 56.5 | 56.5 | 56.5 | 56.5 |
| 2. Glass Fiber[c] | 40 | 40 | 40 | 40 | 40 | 40 |
| 3. Polyethylene, LD[d] | 1 | 1 | 1 | 1 | 1 | 1 |
| 4. Silane, 1 Wt. % of: | 1506[g] | AMEO[h] | IMEO[j] | 1100[k] | 1100[k] | 1506[g] |
| 5. Mold Corrosion Inhibitor | | | | | | |
| $Li_2CO_3$ | — | — | — | — | — | — |
| DHT-4A[l] | 1 | 1 | 1 | 1 | 1 | 1 |
| 6. Pigment[m] | 0.5 | 0.5 | 0.5 | 0.5 | 0.5 | 0.5 |
| B. Properties | | | | | | |
| 1. Insulation Resistance, ohm | $1.7 \times 10^{10}$ | $7.2 \times 10^{10}$ | $8.5 \times 10^9$ | $1.7 \times 10^{11}$ | $3.6 \times 10^{10}$ | $7.2 \times 10^9$ |
| 2. Cracking Resistance | | | | | | |
| a. Cut and Annealed[n] Non-sprue side | 8 | 7 | 7 | 6 | 6 | 6 |
| b. Annealed and Cut[n] Non-sprue side | 4 | 0 | 2 | 3 | 1 | 0 |
| C. Machine Conditions | | | | | | |
| 1. Zone Temp, °F. | | | | | | |
| a. Zone 1 | 684 | 621 | 672 | 676 | 603 | 598 |
| b. Zone 2 | 693 | 620 | 633 | 642 | 572 | 572 |
| c. Zone 3 | 698 | 609 | 622 | 625 | 566 | 565 |
| d. Zone 4 | 702 | 611 | 617 | 614 | 564 | 562 |
| e. Zone 5 | 704 | 612 | 617 | 615 | 564 | 557 |
| f. Zone 6 | 700 | 703 | 614 | 615 | 560 | 565 |
| g. Zone 7 | 700 | 610 | 615 | 615 | 562 | 561 |
| h. Zone 8 | 695 | 611 | 614 | 615 | 570 | 562 |
| 2. Avg Machine Temp, °F. | 697 | 625 | 626 | 627 | 570 | c |
| 3. Die Face Melt Temp, °F. | 654 | 591 | 580 | 581 | 545 | 549 |
| 4. Production Rate, lb/hr | 138 | 252 | 201 | 208 | 61 | 90 |

Footnotes:
[a]Polyphenylene sulfide, PPCo, Flow Rate 20-65
[b]Polyphenylene sulfide, PPCo, Flow Rate 160-280
[c]Owens-Corning Fiberglas 497
[d]Allied Chemical Co., AC-6A, density 0.920, Melt Index >400, softening point 222° F., viscosity 350 cps at 140° C.
[e]Union Carbide Corp., Y9194, a silane defined by the general formula:

$$CH_3CH_2-O$$
$$CH_3CH_2-O-Si-CH_2CH_2$$
$$CH_3CH_2-O$$

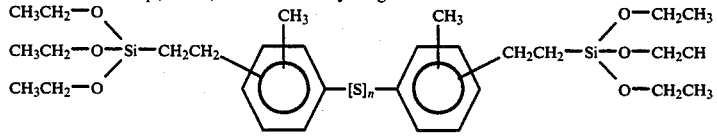

$$O-CH_2CH_3$$
$$CH_2CH_2-Si-O-CH_2CH$$
$$O-CH_2CH_3$$

wherein n is within the range of 2 to about 4 with an average of about 2.8,
[f]Union Carbide Corp., A-189, gamma-mercaptopropyltrimethoxysilane
[g]Kay-Fries Inc. Dynasylan 1506, gamma-aminopropylmethyldiethoxysilane
[h]Kay-Fries Inc. Dynasylan AMEO, gamma-aminopropyltriethoxysilane
[i]Dow-Corning Crop., Z6032, N—{2-[3-(trimethoxysilyl)propylamino]ethyl}-p-vinylbenzylammonium chloride
[j]Kay-Fries, Inc. Dynasylan IMEO, gamma-[1(4,5-dihydroimidazoline)]-propyltriethoxysilane
[k]Union Carbide Corp., A-1100, gamma-aminopropyltriethoxysilane
[l]Kyowa Chemicals Industry Co. Ltd., DHT-4A synthetic hydrotalcite
[m]Degussa, Special Black-4, Regular color Channel Black
[n]Number of disks cracked out of eight tested The data in Table III illustrate the non-inventive compositions of Examples 1 through 8 fail because the insulation resistance is below $1.0 \times 10^9$ ohms even though in some instances all four major components suitable for use in the present inventive composition are used, for example, as shown in Examples 5 and 7. It is believed that the high production rates for Examples 5 and 7 may have resulted in non-homogeneity of the compositions.

Examples 18 and 19 employed a silane within the scope of the present invention and had excellent insulation resistance, but the cracking resistance was unacceptable. These examples illustrate the importance of using a relatively low average machine temperature in order to not adversely affect the cracking resistance. It is also noted that there is a disparity between the results obtained in Examples 5 and 12 which are identical formulations except that in Example 12 the insulation resistance meets the minimum required where in Example 5 the insulation resistance was below the minimum. In both examples the cracking resistance was very good. It is believed that the high production rate in Example 5 caused some non-uniformity in the resulting polymer as compared to Example 12 which gave an insulation resistance value slightly below the minimum required. Examples 12 through 17 and 20 through 24 show the inventive compositions having both good cracking resistance and electrical insulation resistance.

That which is claimed is:

1. A composition comprising:
   (a) in the range of about 30 to about 80 weight percent poly(arylene sulfide), based on the total weight of the composition,
   (b) a reinforcing material,
   (c) in the range of about 0.5 to about 10 weight percent low density polyethylene, based on the total weight of the composition, and
   (d) at least one organosilane represented by the general formula:

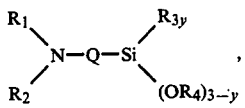

where
$R_1$ and $R_2$ are individually selected from the group consisting of hydrogen, alkyl, alkaryl, aminoalkyl, carboxyalkylaminoalkyl, aryl, aralkyl, carbamoyl, hydroxyalkyl, and vinylaralkylaminoalkyl grops containing 1 to 10 carbon atoms, and where $R_1$ and $R_2$ also may be joined by a valance bond to form a cyclic structure of from 5 to 16 atoms including the nitrogen atom therein, $R_3$ and $R_4$ are individually selected from the group consisting of alkyl and cycloalkyl groups containing 1 to 6 carbon atoms, Q is a divalent hydrocarbon radical containing from 1 to 18 carbon atoms, and y is 0, 1, or 2,
wherein said composition provides an electrical insulation resistance of at least $1.0 \times 110^9$ ohms, and said composition provides good crack resistance.

2. The composition of claim 1 wherein the amount of said reinforcing material in said composition is selected within the range of about 20 to about 70 weight percent based on total weight of the composition; and
wherein the amount of the at least one organosilane in said composition is selected within the range from about 0.1 to about 5 weight percent based on total weight of the composition.

3. The composition of claim 1 wherein the amount of poly(arylene sulfide) in said composition is selected within the range of about 40 to about 75 weight percent based on total weight of the composition;
wherein the amount of said reinforcing material in said composition is selected within the range of about 25 to about 60 weight percent based on total weight of the composition;
wherein the amount of low density polyethylene in said composition is selected within the range of about 0.5 to about 5 weight percent based on total weight of the composition; and
wherein the amount of at least one organosilane in said composition is selected within the range of about 0.1 to about 4 weight percent based on total weight of the composition.

4. The composition of claim 1 wherein the amount of poly(arylene sulfide) in said composition is selected within the range of about 50 to about 70 weight percent based on total weight of the composition;
wherein the amount of said reinforcing material in said composition is selected within the range of about 30 to about 50 weight percent based on total weight of the composition;
wherein the amount of low density polyethylene in said composition is selected within the range of about 0.75 to about 3 weight percent based on total weight of the composition; and
wherein the amount of at least one organosilane in said composition is selected within the range of about 0.25 to about 3 weight percent based on total weight of the composition.

5. The composition of claim 1 further comprising a pigment and a mold corrosion inhibitor wherein said pigment comprises channel black in an amount selected within the range of about 0.1 to about 5 weight percent based on total weight of the composition and the mold corrosion inhibitor comprises a hydrotalcite in an amount selected within the range of about 0.1 to about 10 weight percent based on total weight of the composition.

6. The composition of claim 5 wherein the amount of pigment is selected within the range of about 0.1 to about 3 weight percent based on total weight of the composition in the amount of mold corrosion inhibitor is selected within the range of about 0.2 to about 7 weight percent based on total weight of the composition.

7. The composition of claim 5 wherein the amount of pigment is selected within the range of about 0.2 to about 2 weight percent based on total weight of the composition in the amount of mold corrosion inhibitor is selected within the range of about 0.5 to about 5 weight percent based on total weight of the composition.

8. The composition of claim 1 wherein the reinforcing material comprises glass fibers.

9. The composition of claim 1 further comprising channel black pigment and a hydrotalcite mold corrosion inhibitor.

10. A process for producing the composition of claim 1 wherein the poly(arylene sulfide), the reinforcing material, the low density polyethylene, and the at least one organosilane are dry mixed together to produce a blend and the blend is melt extruded to produce the composition wherein the melt extrusion is carried out at an average machine temperature of less than 675° F. so as to obtain good homogeneity of the resulting composition.

11. The process of claim 10 wherein the average machine temperature is less than 650° F.

12. The process of claim 10 wherein the average machine temperature is less than 625° F.

13. The composition of claim 1 wherein the poly(arylene sulfide) comprises poly(phenylene sulfide) having a melt flow in the range of about 10 to about 400 g/10 min, wherein the reinforcing material comprises glass fibers suitable for electrical applications,
wherein the low density polyethylene has a density of from about 0.910 to about 0.940 and wherein the organosilane is selected from the group consisting of:
3-Aminopropyltrimethoxysilane,
3-Aminopropyltriethoxysilane,
3-Aminopropylmethyldiethoxysilane,
N-Phenyl-3-aminopropyltrimethoxysilane,
p-Aminophenyltrimethoxysilane,
3-(Diethylamino)propyltrimethoxysilane,
N-beta-(Aminoethyl)-gamma-aminopropyltrimethoxysilane, N-(2-aminoethyl)-N'-((3-trimethoxysilyl)propyl)-
1,2-ethanediamine,
N-(3-aminopropyl)-N'-(trimethoxysilyl)methyl)-
1,3-propanediamine,
Methyl 3-(2-(trimethoxysilylpropylamino)-ethylamino)propionate,
N-(2-(3-(trimethoxysilyl)propylamino)ethyl)-p-vinylbenzylammonium chloride,
N-bis-(2-hydroxyethyl)-3-aminopropyltriethoxysilane,
gamma-Ureidopropyltriethyloxysilane and
gamma-(1-(4,5-dihydroimidazoline)-propyltriethoxysilane.

14. A composition comprising
(a) in the range of about 30 to about 80 weight percent poly(arylene sulfide), based on the total weight of the composition,
(b) in the range of about 20 to about 70 weight percent reinforcing material, based on the total weight of the composition,
(c) in the range of about 0.5 to about 10 weight percent low density polyethylene, based on the total weight of the composition,
(d) in the range of about 0.1 to about 5 weight percent of at least one organosilane, based on the total weight of the composition, the said organosilane represented by the general formula:

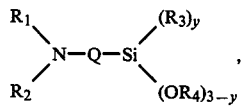

where $R_1$ and $R_2$ are individually selected from the group consisting of hydrogen, alkyl, alkaryl, aminoalkyl, carboxyalkylaminoalkyl, aryl, aralkyl, carbamoyl, hydroxyalkyl, and vinylaralkylaminoalkyl groups containing 1 to 10 carbon atoms, and where $R_1$ and $R_2$ also may be joined by the valance bond to form a cyclic structure of from 5 to 16 atoms including the nitrogen atom therein, $R_3$ and $R_4$ are individually selected from the group consisting of alkyl and cycloalkyl groups containing 1 to 6 carbon atoms, Q is a divalent hydrocarbon radical containing from 1 to 18 carbon atoms, and y is 0, 1 or 2.

15. The composition of claim 14 wherein the amount of poly(arylene sulfide) in said composition is selected within the range of about 40 to about 75 weight percent based on total weight of the composition;
wherein the amount of said reinforcing material in said composition is selected within the range of about 25 to about 60 weight percent based on total weight of the composition;
wherein the amount of low density polyethylene in said composition is selected within the range of about 0.5 to about 5 weight percent based on total weight of the composition; and
wherein the amount of at least one organosilane in said composition is selected within the range of about 0.1 to about 4 weight percent based on total weight of the composition.

16. The composition of claim 14 wherein the amount of poly(arylene sulfide) in said composition is selected within the range of about 50 to about 70 weight percent based on total weight of the composition;
wherein the amount of said reinforcing material in said composition is selected within the range of about 30 to about 50 weight percent based on total weight of the composition;
wherein the amount of low density polyethylene in said composition is selected within the range of about 0.75 to about 3 weight percent based on total weight of the composition; and
wherein the amount of at least one organosilane in said composition is selected within the range of about 0.25 to about 3 weight percent based on total weight of the composition.

17. The composition of claim 14 further comprising channel black pigment and a hydrotalcite mold corrosion inhibitor.

18. The composition of claim 17 wherein the amount of pigment is selected within the range of about 0.1 to about 5 weight percent based on total weight of the composition and the amount of mold corrosion inhibitor is selected within the range of about 0.1 to about 10 weight percent based on total weight of the composition.

19. The composition of claim 17 wherein the amount of pigment is selected within the range of about 0.1 to about 3 weight percent based on total weight of the composition and the amount of mold corrosion inhibitor is selected within the range of about 0.2 to about 7 weight percent based on total weight of the composition.

20. The composition of claim 17 wherein the amount of pigment is selected within the range of about 0.2 to about 2 weight percent based on total weight of the composition and the amount of mold corrosion inhibitor is selected within the range of about 0.5 to about 5 weight percent based on total weight of the composition.

21. The composition of claim 14 wherein the reinforcing material comprises glass fibers.

22. The composition of claim 14 wherein the poly(arylene sulfide) comprises poly(phenylene sulfide) having a melt flow in the range of about 10 to about 400 g/10 min, wherein the reinforcing material comprises glass fibers suitable for electrical applications,
wherein the low density polyethylene has a density of from about 0.910 to about 0.940 and wherein the organosilane is selected from the group consisting of:
3-Aminopropyltrimethoxysilane,
3-Aminopropyltriethoxysilane,
3-Aminopropylmethyldiethoxysilane,
N-Phenyl-3-aminopropyltrimethoxysilane,
p-Aminophenyltrimethoxysilane,
3-(Diethylamino)propyltrimethoxysilane,
N-beta-(Aminoethyl)-gamma-aminopropyltrimethoxysilane,
N-(2-Aminoethyl)-N'-[3-trimethoxysilyl)propyl]-1,2-ethanediamine,
N-(3-Aminopropyl)-N'-[(trimethoxysilyl)methyl]-1,3-propanediamine,
Methyl 3-[2-(trimethoxysilylpropylamino)-ethylamino]-propionate,
N-{2-[3-(Trimethoxysilyl)propylamino]ethyl}-p-vinylbenzylammonium chloride,
N-bis-(2-Hydroxyethyl)-3-aminopropyltriethoxysilane, gamma-Ureidopropyltriethyloxysilane, and
gamma-[1-(4,5-Dihydroimidazoline]-propyltriethoxysilane.

23. A process of producing the composition of claim 14, wherein the poly(arylene sulfide), the reinforcing material, the low density polyethylene, and the at least one organosilane are dry mixed together to produce a blend and the blend is melt extruded to produce the composition wherein the melt extrusion is carried out at an average machine temperature of less than 675° F. so as to obtain good homogeneity of the resulting composition.

24. A process of claim 23 wherein the average machine temperature is less than 650° F.

25. A process of claim 23 wherein the average machine temperature is less than 625° F.

26. A process for producing the composition of claim 1 wherein a dry blended mixture of the components are melt extruded at as low an average machine temperature as possible to obtain good homogeneity of the resulting product.

27. A process of claim 26 wherein the average machine temperature is less than 675° F.

28. A process of claim 26 wherein the average machine temperature is less than 650° F.

29. A process of claim 26 wherein the average machine temperature is less than 625° F.

30. A process for producing the composition of claim 14 wherein a dry blended mixture of the components are melt extruded at as low an average machine temperature as possible to obtain good homogeneity of the resulting product.

31. A process of claim 30 wherein the average machine temperature is less than 675° F.

32. A process of claim 30 wherein the average machine temperature is less than 650° F.

33. A process of claim 30 wherein the average machine temperature is less than 625°.

* * * * *

UNITED STATES PATENT AND TRADEMARK OFFICE
CERTIFICATE OF CORRECTION

PATENT NO. : 4,680,326

DATED : July 14, 1987

INVENTOR(S) : John E. Leland, James S. Dix, Roy F. Wright

It is certified that error appears in the above-identified patent and that said Letters Patent are hereby corrected as shown below:

Column 11, lines 15 to 19, that portion of the formula reading $R_{3y}$ should read $(R_3)_y$; line 25 "grops" should read --- groups ---; line 27 "valance" should read --- valence ---; line 35, the exponential expression "$110^9$" should read --- $10^9$ ---. Column 12, line 23 and line 30, for the word "in", each occurrence should read --- and wherein ---. Column 12, line 36, cancel beginning with "9. The composition" to and including "sion inhibitor." in line 38, and insert the following claim:

9. (Amended) The composition of Claim 1 wherein the poly(arylene sulfide) comprises poly(phenylene sulfide) having a melt flow in the range of about 10 to about 400 g/10 min, wherein the reinforcing material comprises glass fibers suitable for electrical applications, wherein the low density polyethylene has a density of from about 0.910 to about 0.940 and wherein the organosilane is selected from the group consisting of:
 3-Aminopropyltrimethoxysilane,
 3-Aminopropyltriethoxysilane,
 3-Aminopropylmethyldiethoxysilane,
 N-Phenyl-3-aminopropyltrimethoxysilane,
 p-Aminophenyltrimethoxysilane,
 3-(Diethylamino)propyltrimethoxysilane,
 N-beta-(Aminoethyl)-gamma-aminopropyltrimethoxysilane,
 N-(2-Aminoethyl)-N'-((3-trimethoxysilyl)propyl)-1,2-
  ethandiamine,
 N-(3-Aminopropyl)-N'-((trimethoxysilyl)methyl)-1,3-
  propanediamine,
 Methyl 3-(2-(trimethoxysilylpropylamino)-ethylamino)-
  propionate,
 N-(2-(3-(Trimethoxysilyl)propylamino)ethyl)-p-
  vinylbenzylammonium chloride,
 N-bis-(2-Hydroxyethyl)-3-aminopropyltriethoxysilane,

UNITED STATES PATENT AND TRADEMARK OFFICE
CERTIFICATE OF CORRECTION

PATENT NO. : 4,680,326                      Page 2 of 2

DATED : July 14, 1987

INVENTOR(S) : John E. Leland, James S. Dix, Roy F. Wright

It is certified that error appears in the above-identified patent and that said Letters Patent are hereby corrected as shown below:

gamma-Ureidopropyltriethyloxysilane, and
    gamma-(1-(4,5-Dihydroimidazoline))-propyltriethoxysilane
    and further comprising a channel black pigment and a
hydrotalcite mold corrosion inhibitor.

Column 13, line 40, "the valance" should read --- a valence ---.

Signed and Sealed this

Third Day of May, 1988

*Attest:*

DONALD J. QUIGG

*Attesting Officer*             *Commissioner of Patents and Trademarks*